US012793044B2

(12) United States Patent
Todd et al.

(10) Patent No.: US 12,793,044 B2
(45) Date of Patent: Nov. 10, 2026

(54) DECENTRALIZED CRYPTO BANK FOR DATA CONFIDENCE FABRIC

(71) Applicant: Dell Products L.P., Round Rock, TX (US)

(72) Inventors: Stephen J. Todd, North Andover, MA (US); Trevor Scott Conn, Leander, TX (US); Ahmed Khalid, Cork (IE); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 18/362,748

(22) Filed: Jul. 31, 2023

(65) Prior Publication Data

US 2025/0045730 A1 Feb. 6, 2025

(51) Int. Cl.
*G06Q 20/36* (2012.01)
*G06Q 20/38* (2012.01)
*G06Q 40/03* (2023.01)

(52) U.S. Cl.
CPC ........... *G06Q 20/36* (2013.01); *G06Q 20/382* (2013.01); *G06Q 40/03* (2023.01)

(58) Field of Classification Search
CPC ...... G06Q 20/36; G06Q 20/382; G06Q 40/02; G06Q 40/03
See application file for complete search history.

(56) References Cited

U.S. PATENT DOCUMENTS 7,302,641 B1 11/2007 Yajima
9,330,389 B2 5/2016 Pitroda et al.
10,135,607 B1 11/2018 Roets
10,438,290 B1 10/2019 Winklevoss et al.
10,581,805 B2 3/2020 Simons et al.
10,601,665 B2 3/2020 Bathen et al.
(Continued)

FOREIGN PATENT DOCUMENTS

CA 3038682 A1 * 10/2019 ........... H04L 63/102
WO 2018/126077 A1 7/2018
(Continued)

OTHER PUBLICATIONS

Dhaigude; Is perceived value enough to create loyalty for m-wallets? Exploring the role of trust and satisfaction; Cogent business & management, Dec. 2023, vol. 10 (3), p. 1-23.*
(Continued)

*Primary Examiner* — Ilse I Immanuel
(74) *Attorney, Agent, or Firm* — Workman Nydegger

(57) ABSTRACT

One example method includes connecting a digital wallet of a customer to an agent of a data confidence fabric, receiving, from an application, a request for performance of a trust function, by the data confidence fabric, with respect to customer data, processing the customer data by applying the trust function to the customer data, returning the data, after the processing, to the agent, creating annotations for the customer data, based on the trust function that was applied, transmitting the annotations, and a corresponding trust provider fee amount, to a smart contract, and when the digital wallet of the customer does not have adequate funds to cover the trust provider fee amount, obtaining funds from an alternate source of funding associated with the data confidence fabric.

16 Claims, 3 Drawing Sheets

(56) References Cited

U.S. PATENT DOCUMENTS

| | | | |
|---|---|---|---|
| 10,871,948 | B1 | 12/2020 | Dowling |
| 10,915,891 | B1 | 2/2021 | Winklevoss et al. |
| 11,108,891 | B1 | 8/2021 | Todd et al. |
| 11,153,280 | B1 | 10/2021 | Walwadkar |
| 11,188,977 | B2 | 11/2021 | Youb et al. |
| 11,200,569 | B1 | 12/2021 | James et al. |
| 11,308,487 | B1 | 4/2022 | Foster et al. |
| 11,334,883 | B1 | 5/2022 | Auerbach et al. |
| 11,416,230 | B2 | 8/2022 | Todd et al. |
| 11,533,381 | B1 | 12/2022 | Hockey |
| 11,562,333 | B1 | 1/2023 | James et al. |
| 11,716,312 | B1 | 8/2023 | Mcnamara, Jr. |
| 11,792,084 | B1 | 10/2023 | Foukas et al. |
| 11,961,070 | B2 | 4/2024 | Sarin |
| 11,971,862 | B1 | 4/2024 | Han et al. |
| 11,978,044 | B2 | 5/2024 | Basu et al. |
| 12,008,561 | B2 | 6/2024 | Cona et al. |
| 12,032,696 | B2 | 7/2024 | Todd |
| 12,045,879 | B2 * | 7/2024 | Rapowitz ............... G06Q 40/03 |
| 12,118,613 | B2 | 10/2024 | Foote et al. |
| 12,141,871 | B1 | 11/2024 | James et al. |
| 2009/0024660 | A1 | 1/2009 | Borgsmidt et al. |
| 2009/0028135 | A1 | 1/2009 | Mantripragada et al. |
| 2009/0144313 | A1 | 6/2009 | Hodge et al. |
| 2010/0082771 | A1 | 4/2010 | Wood et al. |
| 2010/0153835 | A1 | 6/2010 | Xiong et al. |
| 2011/0296510 | A1 | 12/2011 | Hatlelid et al. |
| 2015/0379510 | A1 | 12/2015 | Smith |
| 2016/0117668 | A1 | 4/2016 | Pitroda et al. |
| 2017/0132620 | A1 | 5/2017 | Miller et al. |
| 2018/0101906 | A1 | 4/2018 | Mcdonald et al. |
| 2018/0218343 | A1 | 8/2018 | Kolb et al. |
| 2018/0276626 | A1 | 9/2018 | Laiben |
| 2018/0287800 | A1 | 10/2018 | Chapman et al. |
| 2018/0329693 | A1 | 11/2018 | Eksten et al. |
| 2019/0019251 | A1 * | 1/2019 | Phillips, IV ........... G06Q 40/06 |
| 2019/0116158 | A1 | 4/2019 | Patil et al. |
| 2019/0238316 | A1 | 8/2019 | Padmanabhan |
| 2019/0260803 | A1 | 8/2019 | Bykampadi et al. |
| 2019/0303942 | A1 | 10/2019 | Balaraman et al. |
| 2019/0333054 | A1 | 10/2019 | Cona et al. |
| 2019/0347406 | A1 | 11/2019 | Lev-Ran et al. |
| 2019/0379642 | A1 | 12/2019 | Simons et al. |
| 2019/0385153 | A1 | 12/2019 | Cui et al. |
| 2019/0385154 | A1 | 12/2019 | Cui et al. |
| 2019/0386969 | A1 | 12/2019 | Verzun et al. |
| 2020/0007312 | A1 | 1/2020 | Vouk et al. |
| 2020/0027089 | A1 * | 1/2020 | Kuchar ................. H04L 9/3239 |
| 2020/0104819 | A1 | 4/2020 | Garcia |
| 2020/0112443 | A1 | 4/2020 | Todd |
| 2020/0120023 | A1 | 4/2020 | Munson et al. |
| 2020/0133955 | A1 | 4/2020 | Padmanabhan et al. |
| 2020/0236102 | A1 | 7/2020 | Azulay et al. |
| 2020/0313856 | A1 | 10/2020 | Basu et al. |
| 2020/0344233 | A1 | 10/2020 | Lai et al. |
| 2021/0027404 | A1 | 1/2021 | De Bold |
| 2021/0082044 | A1 * | 3/2021 | Sliwka .................. H04L 9/3255 |
| 2021/0112117 | A1 | 4/2021 | Munson et al. |
| 2021/0124727 | A1 | 4/2021 | Todd et al. |
| 2021/0124728 | A1 | 4/2021 | Todd et al. |
| 2021/0126794 | A1 | 4/2021 | Forrester et al. |
| 2021/0164794 | A1 | 6/2021 | Nagpal et al. |
| 2021/0192520 | A1 | 6/2021 | Patel et al. |
| 2021/0209684 | A1 | 7/2021 | Foote et al. |
| 2021/0243167 | A1 | 8/2021 | Todd et al. |
| 2021/0243218 | A1 | 8/2021 | Todd et al. |
| 2021/0304065 | A1 | 9/2021 | Todd et al. |
| 2021/0328886 | A1 | 10/2021 | Guim et al. |
| 2021/0342803 | A1 | 11/2021 | Yoo |
| 2021/0365445 | A1 | 11/2021 | Robell et al. |
| 2021/0366586 | A1 | 11/2021 | Ryan et al. |
| 2021/0374730 | A1 | 12/2021 | Todd et al. |
| 2021/0385216 | A1 | 12/2021 | Khalil et al. |
| 2021/0405983 | A1 | 12/2021 | Todd et al. |
| 2021/0409436 | A1 | 12/2021 | Todd et al. |
| 2022/0021711 | A1 | 1/2022 | Marsh et al. |
| 2022/0038289 | A1 | 2/2022 | Huang |
| 2022/0084015 | A1 | 3/2022 | Fawzy et al. |
| 2022/0100858 | A1 | 3/2022 | Todd |
| 2022/0100879 | A1 | 3/2022 | Todd et al. |
| 2022/0116445 | A1 | 4/2022 | Filippou et al. |
| 2022/0129555 | A1 | 4/2022 | Todd |
| 2022/0138325 | A1 | 5/2022 | Todd et al. |
| 2022/0188800 | A1 | 6/2022 | Sells et al. |
| 2022/0210061 | A1 | 6/2022 | Simu et al. |
| 2022/0253842 | A1 | 8/2022 | James et al. |
| 2022/0261882 | A1 | 8/2022 | Youb et al. |
| 2022/0272127 | A1 | 8/2022 | Yawalkar et al. |
| 2022/0294690 | A1 | 9/2022 | Nolan et al. |
| 2022/0327529 | A1 | 10/2022 | Williams et al. |
| 2022/0351232 | A1 | 11/2022 | Chan et al. |
| 2023/0114684 | A1 | 4/2023 | Jakobsson et al. |
| 2023/0155984 | A1 | 5/2023 | Adam et al. |
| 2023/0173395 | A1 | 6/2023 | Cella et al. |
| 2023/0196318 | A1 | 6/2023 | Rosen et al. |
| 2023/0230091 | A1 | 7/2023 | Robert |
| 2023/0237403 | A1 | 7/2023 | Reineke et al. |
| 2023/0237499 | A1 | 7/2023 | Padmanabhan |
| 2023/0334492 | A1 | 10/2023 | Tai et al. |
| 2023/0351393 | A1 * | 11/2023 | Cella .................. G06Q 30/0206 |
| 2023/0362015 | A1 | 11/2023 | Kayaba et al. |
| 2024/0046318 | A1 | 2/2024 | Muriqi |
| 2024/0106839 | A1 | 3/2024 | Smith et al. |
| 2024/0152889 | A1 | 5/2024 | Todd et al. |
| 2024/0152911 | A1 | 5/2024 | Rezaiean-Asel et al. |
| 2024/0249277 | A1 | 7/2024 | Hwang |
| 2024/0256691 | A1 | 8/2024 | Hwang |
| 2024/0281799 | A1 | 8/2024 | Ryan |
| 2024/0289776 | A1 | 8/2024 | Bimolaksono et al. |
| 2024/0354735 | A1 | 10/2024 | Kell et al. |
| 2024/0354747 | A1 | 10/2024 | Belostock et al. |
| 2024/0364521 | A1 | 10/2024 | Tang |
| 2025/0088376 | A1 | 3/2025 | Ren et al. |

FOREIGN PATENT DOCUMENTS

| | | | |
|---|---|---|---|
| WO | 2019/210409 | A1 | 11/2019 |
| WO | 2020/124317 | A1 | 6/2020 |
| WO | 2021/173716 | A1 | 9/2021 |

OTHER PUBLICATIONS

Murphy et al., Towards trust-based data weighting in machine learning, 2023 IEEE 31st International Conference on Network Protocols (ICNP), pp. 1-6 (Oct. 2023) (Year: 2023).

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

* cited by examiner

DECENTRALIZED CRYPTO BANK FOR DATA CONFIDENCE FABRIC

FIELD OF THE INVENTION

Embodiments of the present invention generally relate to data confidence fabrics. More particularly, at least some embodiments of the invention relate to systems, hardware, software, computer-readable media, and methods, for the implementation and use of mechanisms for effecting financial, and other, transactions in the context of a data confidence fabric.

BACKGROUND

The provision of trust services through data confidence fabric (DCF) functions, such as evaluation and annotation of data with confidence metadata, may be important to consumers, since the data confidence information may reflect the extent to which the customer data is deemed to be trustworthy and suitable for use by applications, and other users. Thus, the consumer has an interest in obtaining, and maintaining, performance of the trust services with respect to its data. However, problems can arise if the consumer does not have adequate funds available to pay for the needed trust services. For example, provision of the trust services may be terminated if the consumer is unable to pay for them.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
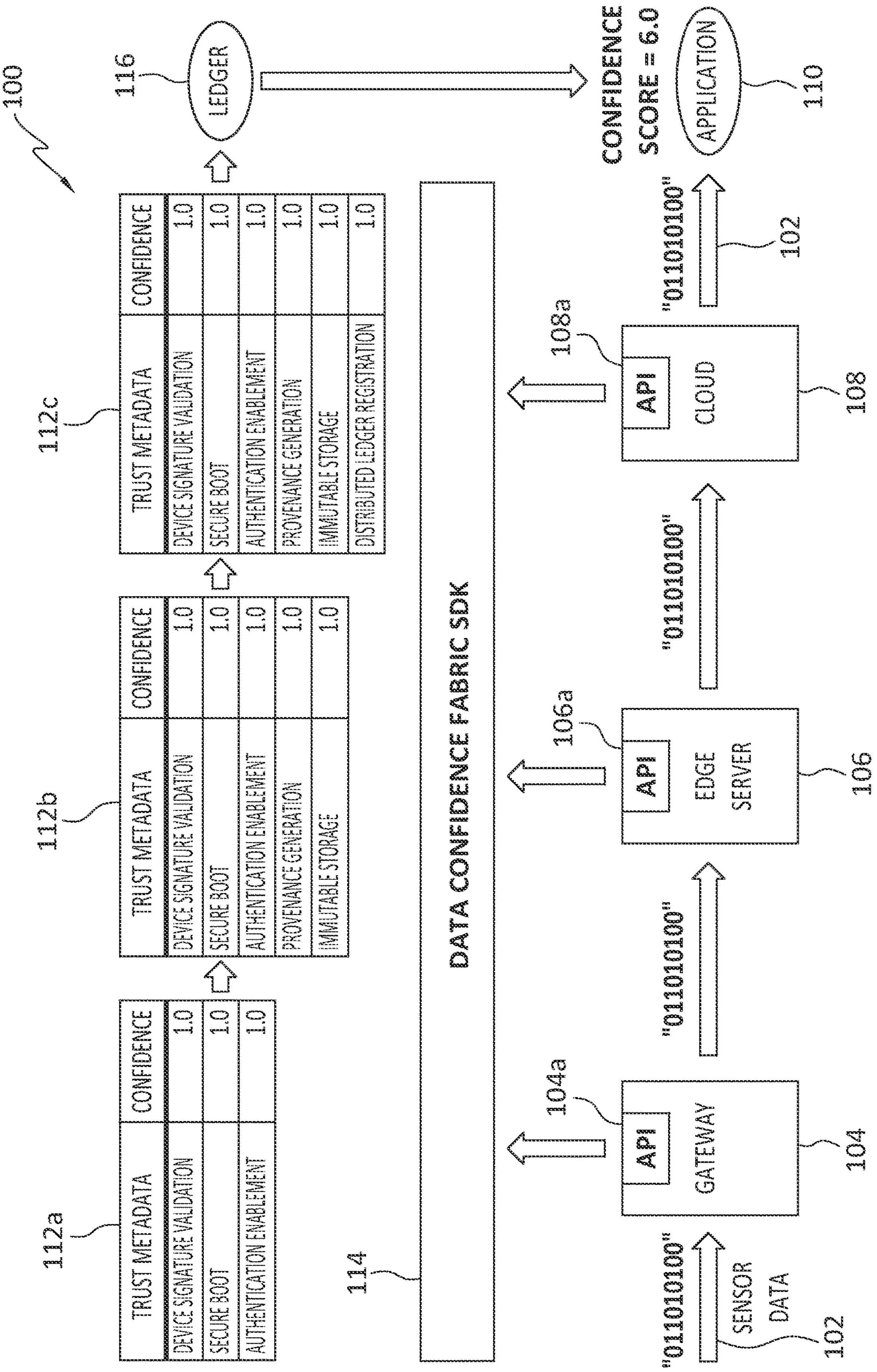
FIG. 1 discloses aspects of a data confidence fabric according to one example embodiment.

Embodiments of the present invention generally relate to data confidence fabrics. More particularly, at least some embodiments of the invention relate to systems, hardware, software, computer-readable media, and methods, for the implementation and use of mechanisms for effecting financial, and other, transactions and operations in the context of a data confidence fabric.

In general, aspects of an embodiment of the invention may be integrated into, and interoperate with, a DCF and its associated components, functions, and operations. In one example embodiment, an entity and associated methods are provided that may facilitate wider adaptation of the features and functions of a DCF. In more detail, an embodiment may comprise a method that includes registering customers and using customer credit scores to determine the creditworthiness of a customer account. Based on this analysis, a loan may then be made by a D-DCF (decentralized data confidence fabric) bank to the customer solely for the purpose of enabling the customer to make payments to the trust provider for the provision of trust services. In an embodiment, the loan may be made with terms for interest payments to the D-DCF bank. An embodiment may provide an option for customers to deposit and use funds for payments to the trust provider, such as through the Alvarium SDK or other suitable interface, instead of making those payments from a customer wallet. The customer wallet may sometimes be referred to herein as a digital wallet, a user wallet, or a cryptocurrency wallet.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a decentralized bank, such as a cryptocurrency bank for example, is implemented that may provide loan, credit, and deposit, services to a DCF customer. An embodiment may implement transactions between a DCF customer and trust provider using smart contracts. An embodiment may provide various payment mechanisms which may help to ensure that a DCF customer continues to receive trust services, and the trust service provider continues to receive payment for those trust services. An embodiment may provide for the expansion, and improvement, of the functionality of a DCF. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Moreover, an embodiment may comprise, or consist of, operations that are performed only by various types of computing entities, and are not performed by any human(s). That is, unless an embodiment explicitly identifies a human as performing one or more operations of that embodiment, such operations should be understood to be computer-implemented.

A. Aspects of an Example Architecture and Environment

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112*a*, 112*b*, and 112*c* may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112*a*, 112*b*, and 112*c*, may comprise, for example, respective confidence scores associated with trust insertion processes performed by the nodes with respect to the data 102. The trust metadata 112*a*, 112*b*, and 112*c* may be associated with the data 102 by respective node APIs (Application Program Interfaces) 104*a*, 106*a*, and 108*a* that communicate with an interface 114 such as an Alvarium SDK (Software Development Kit). After the data 102 has transited the various nodes, the final, comprehensive trust metadata 112*c* may be entered into a ledger 116 which may make the trust metadata 112*c* available for use by the applications 110. Note that, in this example, the trust metadata 112*c* is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112*a* for each of three different operations. Particularly, the gateway 104 may annotate trust metadata 112*a* that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112*a*, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112*a*, ultimately arrives at the ledger 116, where a ledger entry may be created that permanently records the contents of the trust metadata 112*a* table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112*a*, 112*b*, and 112*c*, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104*a*, 106*a*, and 108*a*, respectively, and routing software may be provided at these nodes that forwards the annotations along the data path.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Context for an Embodiment

To create a payment mechanism for a DCF based on cryptocurrency and smart contracts, an entity similar, in some respects, to traditional banks may be employed that may, in one embodiment, operate to ensure scalability, seamless transactions, and alternative payment methods for customers of the DCF trust provider. An embodiment may implement a decentralized data confidence fabric bank (D-DCF) to resolve one or more problems, such as an insufficient balance in a customer wallet. An embodiment may comprise additional functions that may enable smart contracts to make bank operations available to customers. In an embodiment, one or more of these functions may be standardized and imported by a trust provider when defining and deploying their smart contract. In an embodiment, a D-DCF bank standard contract may be based on existing fungible token standards, such as ERC20 (Ethereum Request for Comments 20) for example, but may include additional functions as disclosed herein.

C. Overview of an Example Embodiment

One example embodiment comprises an entity, and associated operations, that carries out some tasks associated with conventional banks, and which may also be helpful in enabling and facilitating wider adaptation of the DCF. One example embodiment comprises a method that includes the following operations: [1] registering customers and using credit scores to determine creditworthiness of a customer's account; [2] providing loans to customers for D-DCF payments with well-defined terms for interest payments; and [3] providing a mechanism for customers to deposit and use funds for payments to a trust provider, instead of paying from their own wallet. In this embodiment, the D-DCF bank does not act as a centralized authority for managing or securing the assets of a customer. Instead, in an embodiment, the decentralized D-DCF bank may perform the aforementioned operations by way of one or more smart contracts, so as to maintain the benefits of decentralized and distributed ledger technologies such as may be employed in connection with a DCF.

D. Example Architecture and Methods

Figure 2:
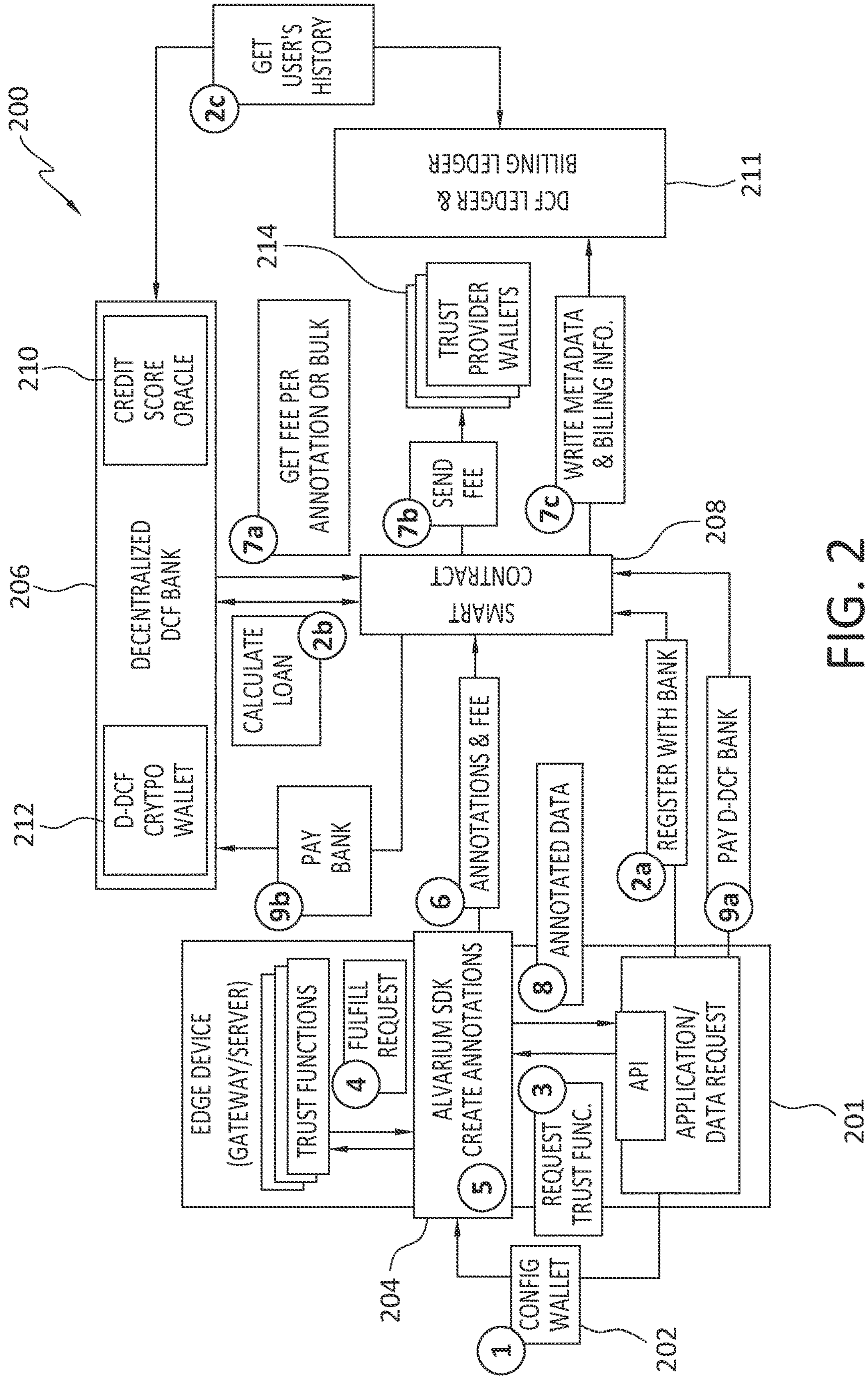
FIG. 2 discloses aspects of an architecture and related methods and operations according to one example embodiment.

With attention now to FIG. 2, an example architecture according to one embodiment is denoted generally at 200. In general, FIG. 2 discloses a D-DCF bank, and associated operations, for providing loans to customers of a trust provider in a secure manner. Note that the example of FIG. 2 refers to one or more particular payment mechanisms, but it should be understood that those are provided only by way of example and not limitation and, accordingly, the D-DCF bank concepts and functionalities disclosed herein may be applied to other payment mechanisms as well. An example of a DCF is disclosed in FIG. 1, and various systems, methods, and operations, relating to DCFs are disclosed in Appendix A hereto. Appendix A is a part of this disclosure and is incorporated herein in its entirety by this reference.

Particular reference is now made to FIG. 2, using the numbering disclosed there. Initially, a customer 201, which may comprise an application and/or data source such as an edge device, that wishes to join the DCF, may connect [1] a wallet 202, which may be a cryptocurrency wallet for example, to a framework and interface such as the Alvarium SDK 204, which may be referred to herein simply as 'Alvarium' '204. In an embodiment, Alvarium 204 may comprise an agent that may perform any one or more of the functions attributed herein to 'Alvarium.' The currency in by the wallet 202 may be used to pay a trust provider fee, as well as gas or network fees, if applicable. Note that as used herein, a 'gas fee' embraces, but is not limited to, fees incurred in using the DCF. Such fees may be assessed, for example, on the number of transactions engaged in by the customer 201, which may be expressed as a number of API (application program interface) calls for example.

In an embodiment, the customer 201 may request registration [2a] of its account with a D-DCF bank 206. In an embodiment, a smart contract 208 and associated function may be defined that may be called by the customer 201. The smart contract 208 may forward [2b] the registration request to an oracle of the D-DCF bank 206 that may calculate the total amount the D-DCF bank 206 is willing to loan to the customer 201. Note that this calculation operation may also be performed within the smart contract 208 for complete transparency.

However the cost of performing the calculation may be indeterminate, or high, depending on the underlying DLT (distributed ledger technology) and the complexity of the calculation function. Where a proprietary credit score calculation mechanism is to be used, the D-DCF bank 206 may, in one embodiment, use an oracle 210 which may be called by the smart contract 208, and the results then returned by the oracle 210 to the smart contract 208. In an embodiment, the D-DCF bank 206 may calculate a maximum possible loan amount by querying [2c] the DCF and billing ledgers 211 to obtain information about the past transactions and payment history of the customer 201. The information obtained as a result of the query [2c] may then be shared, either directly or by way of the D-DCF bank 206, with the smart contract 208 and the customer 201.

With continued reference to FIG. 2, an application of the customer 201 may request [3], such as by way of Alvarium 204, trust functions to be applied, by a trust provider associated with the DCF, to customer 201 data. Such trust functions may comprise, for example, the creation of trust metadata concerning customer 201 data. After the request [3] is fulfilled [4] by the trust provider, the processed data may be returned to Alvarium 204, and Alvarium 204 may then create annotations, based on the trust metadata, for the customer 201 data based on the applied function(s).

In an embodiment, the annotations may then be sent [6] to the smart contract 208 along with a fee assessed by the trust provider. In an embodiment, the function call will not fail at this step if the wallet 202 of the customer does not have sufficient funds to pay the trust provider fee. Instead, the D-DCF bank 206 may pay the trust provider fee on behalf of the customer 201. In this way, the customer may continue to received needed trust services even when the customer does not have adequate funds available to pay the trust provider fee. Following is a discussion of an approach for providing payment to the trust provider.

In particular, if the customer 201 lacks sufficient funds to pay the trust provider fee, then the smart contract 208 may, possibly automatically, attempt to deduct the fee from the wallet 212 of the D-DCF bank 206. Assuming that the D-DCF bank 206 always has a balance adequate to cover fees assessed by the trust provider, service disruptions to the customer 201, due to the inability to timely make payment, may thus be eliminated.

In an embodiment, payment may be obtained from the wallet 212 of the D-DCF bank 206 in at least two different ways. For example, a bulk amount based on the agreed upon loan may be transferred [7a] from the wallet 212 of the D-DCF bank 206 to the smart contract 208 under the customer 201 name. Then for each trust function call [3] from the customer 201, the smart contract 208 may transfer the corresponding fee from this loan in the wallet 212 to the wallet 214 of the trust provider. As another example, on each annotation provided by the trust provider, the smart contract 208 may check the credit limit for the customer 201 and call [7a] a transfer function to transfer the trust provider fee from the wallet 212 of the D-DCF bank 206 to the provider wallet 214.

Once the smart contract 208 has the required fee to send to the trust provider, however that fee may have been obtained, such as by way of either of the examples noted above or by obtaining the fee from the customer wallet 202, the fee may be sent [7b] by the smart contract 208 to the trust provider wallet 214. After the trust provider has received the fee, the annotations made concerning the customer data may then be written [7c] to the DCF/billing ledger 211 of the trust provider. In an embodiment, the billing information may written to a separate billing ledger if the underlying payment mechanism maintains a separate ledger for billing records. Next, annotated data may be sent [8] back to the application by the DCF.

At some point, based on the terms set out in the smart contract 208, the customer 201 may pay back [9a] the loan to the D-DCF bank 206. In an embodiment, this may be done by calling a smart contract 208 function by the customer 201. The customer 201 may use any wallet, including the wallet 202, or account to pay off any arrears. Finally, the smart contract 208 function may confirm that the amount paid [9a] matches the arrears, including any interest payment set in the smart contract 208, and transfer [9b] the amount back to the D-DCF bank 206.

It is noted in connection with the discussion of the example embodiments of FIG. 2, that the use of smart contracts such as smart contract 208 may help to ensure that the terms and conditions of the smart contract 208 are met by the customer 201. For example, an embodiment of the invention may ensure that any loan made by the D-DCF bank 206 to the customer 201 is only used by the customer 201 for paying trust provider fees. Similarly, the D-DCF bank 206 may refuse to give any additional loans to a customer 201 who fails to meet the term conditions in a previous agreement. In an embodiment, a D-DCF bank 206 may permit the customer 201 ti deposit additional balance, such as at [09a], which, along with other operations of an example embodiment, may serve as an alternate payment method for the customer 201. That is, the customer 201 may then use their D-DCF bank 206 balance to pay trust providers, instead of using their wallet 202 directly.

E. Further Discussion

As disclosed herein, an example embodiment may provide and employ a decentralized data confidence fabric bank, or D-DCF bank, that provides loan, credit, and deposit services to DCF customers who have a need for services, such as trust services, provided by way of a DCF. In an embodiment, a D-DCF bank comprises an entity that is associated with, and possibly integrated into, a DCF, and may typically carry a balance large enough to cover trust provider fees for multiple transactions and/or multiple customers. An embodiment may comprise specific functions implemented within a smart contract to build a trustworthy environment for defining terms among parties, and for automatically executing transactions based upon those terms. Specifically, in [2] of the example of FIG. 2, and embodiment may register customers with a D-DCF bank through a smart contract while using the bank credit scoring mechanisms to determine a suitable loan amount for the customer. In [7] of the example of FIG. 2, and embodiment may provide for payment, such as for trust services provided in a DCF, through multiple alternate mechanisms where an insufficient balance in a customer wallet may automatically trigger payment through the D-DCF bank, and may cover the gap to ensure that a trust provider continues to receive its payment, and the customer continues to receive trust services.

F. Example Use Case

Following are aspects of one example use case for an embodiment of the invention. This example use case is not intended to limit the scope of the invention in any way and is provided for the purposes of illustration.

FIG. 2 discloses aspects of an example use-case in which a customer that intends to utilize DCF functionalities, such as data annotation with confidence information, may register with a D-DCF bank and ensure that their data pipeline continues functioning even in the case of a low account balance. Reconstructing and reprocessing annotations for a past instant in time could be costly, especially given the amount of volume. Thus, including a D-DCF bank, and associated elements, in the DCF environment, that may step in on behalf of customers, may be helpful in seamless and continuous operation of the DCF while keeping the system flexible for customers whose ability to pay may vary.

G. Example Methods

It is noted with respect to the disclosed methods, including the example method of FIG. 1-2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

H. Further Example Embodiments

Following are some further example embodiments of the invention. These are presented only by way of example and are not intended to limit the scope of the invention in any way.

Embodiment 1. A method, comprising: connecting a digital wallet of a customer to an agent of a data confidence fabric; receiving, from an application, a request for performance of a trust function, by the data confidence fabric, with respect to customer data; processing the customer data by applying the trust function to the customer data; returning the data, after the processing, to the agent; creating annotations for the customer data, based on the trust function that was applied; transmitting the annotations, and a corresponding trust provider fee amount, to a smart contract; and when the digital wallet of the customer does not have adequate funds to cover the trust provider fee amount, obtaining funds from an alternate source of funding associated with the data confidence fabric.

Embodiment 2. The method as recited in any preceding embodiment, wherein after funds are obtained to cover the fee, the data and annotations are transmitted to the customer.

Embodiment 3. The method as recited in any preceding embodiment, wherein the alternate source of funding comprises a decentralized data confidence fabric bank.

Embodiment 4. The method as recited in any preceding embodiment, wherein the alternate source of funding comprises a decentralized data confidence fabric bank that determines a maximum amount of a potential loan to the customer.

Embodiment 5. The method as recited in any preceding embodiment, wherein a smart contract enables communications between the customer and the alternate source of funding.

Embodiment 6. The method as recited in any preceding embodiment, wherein the obtaining of the funds from the alternate source of funding associated with the data confidence fabric enables the customer to continue to receive trust services from the data confidence fabric without interruption that would otherwise result from lack of payment, by the customer, of the trust provider fee amount.

Embodiment 7. The method as recited in any preceding embodiment, wherein obtaining the funds from the alternate source of funding comprises deduction, by a smart contract, of the trust provider fee amount from a decentralized data confidence fabric bank.

Embodiment 8. The method as recited in any preceding embodiment, wherein after a smart contract obtains the funds from the alternate source of funding, the smart contract transmits the funds to a digital wallet of the trust provider.

Embodiment 9. The method as recited in any preceding embodiment, wherein obtaining the funds from the alternate source of funding comprises transferring, from the alternate source of funding to a smart contract, a bulk amount of funds that exceeds the trust provider fee amount.

Embodiment 10. The method as recited in any preceding embodiment, wherein obtaining the funds from the alternate source of funding is performed on a per-annotation basis by a smart contract, after the smart contract has determined that a credit limit of the customer has not been exceeded.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
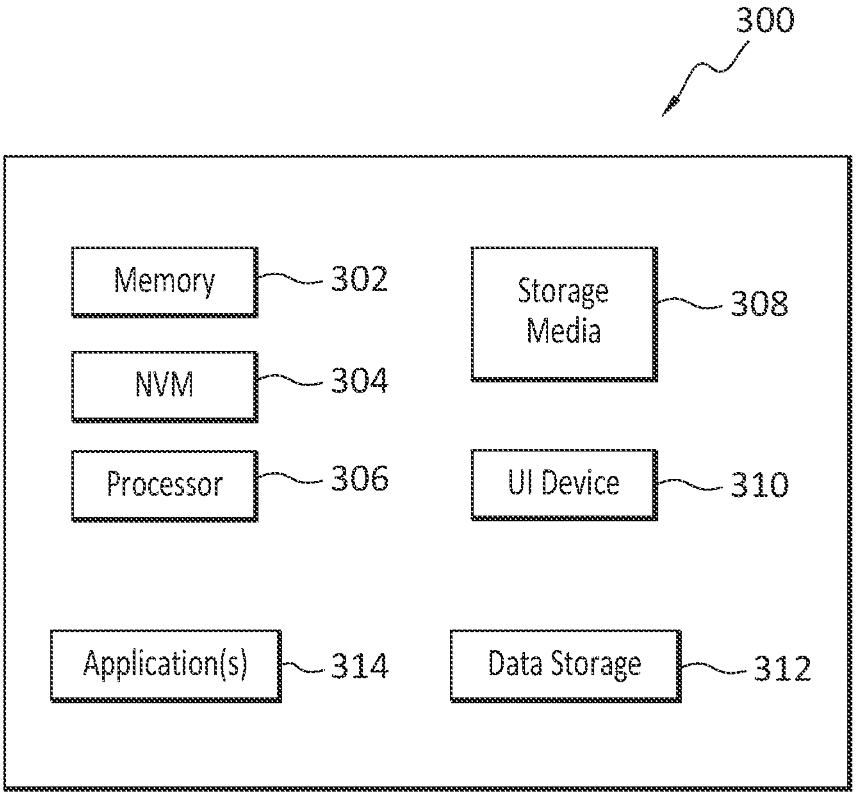
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, readonly memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

connecting a digital wallet of a customer to an agent of a data confidence fabric, where the data confidence fabric is an operating environment in which one or more physical computing devices, including an edge device, operate as respective nodes of the data confidence fabric, wherein the data confidence fabric is associated with a decentralized data confidence fabric bank;

registering a smart contract between the client and the decentralized data confidence fabric bank, within which the decentralized data confidence fabric bank calculates, using an oracle, a credit limit of the customer upon reception of a query by querying data confidence fabric and billing ledgers to obtain past transactions and payment history of the customer and determining a maximum loan amount based on the queried information;

receiving, from a customer application running on the edge device, a request for performance of trust services that comprise a trust function, by one or more computing devices implementing the data confidence fabric, with respect to customer data;

processing, by a trust provider that communicates with the edge device, the customer data by applying the trust function to the customer data, and applying the trust function comprises generating trust metadata concerning the customer data that is accumulated across multiple nodes including a gateway, edge server, and cloud ecosystem and associated with the customer data via respective application programming interfaces (APIs) as the customer data flows through the nodes, and by the one or more computing devices implementing the data confidence fabric and the trust provider;

by the edge device, returning the customer data and the trust metadata to the agent under control of the one or more computing devices implementing the data confidence fabric;

creating, by the trust provider, annotations for the customer data, where the annotations are created based on the trust metadata and wherein the trust metadata comprises confidence scores associated with trust insertion processes performed by the nodes;

transmitting, by the trust provider, the annotations, and a corresponding trust provider fee amount, to a smart contract that enforces payment terms by automatically executing transactions based on conditions of the smart contract; and when the digital wallet of the customer does not have adequate funds to cover the trust provider fee amount, obtaining funds from a digital wallet of the decentralized data confidence fabric bank of funding associated with the data confidence fabric based on the smart contract including automatically deducting the trust provider fee amount from a bank wallet or transferring a bulk loan amount to the smart contract and transferring fees per annotation based on a credit limit determination.

2. The method as recited in claim 1, wherein after funds are obtained to cover the trust provider fee amount, the customer data and annotations are transmitted to the customer.

3. The method as recited in claim 1, wherein the smart contract enables communication of funding between the customer and the decentralized data confidence fabric bank.

4. The method as recited in claim 1, wherein the obtaining of the funds from the decentralized data confidence fabric bank associated with the data confidence fabric enables the customer to continue to receive trust services from the data confidence fabric without interruption that would otherwise result from lack of payment, by the customer, of the trust provider fee amount.

5. The method as recited in claim 1, wherein obtaining the funds from the decentralized data confidence fabric bank comprises deduction, by a smart contract, of the trust provider fee amount from the decentralized data confidence fabric bank in response to determining that the digital wallet of the customer has insufficient funds to cover the trust provider fee amount.

6. The method as recited in claim 1, wherein after the smart contract obtains the funds from the decentralized data confidence fabric bank, the smart contract transmits the funds to a digital wallet of the trust provider.

7. The method as recited in claim 1, wherein obtaining the funds from the decentralized data confidence fabric bank comprises transferring, from the decentralized data confidence fabric bank to a smart contract, a bulk amount of funds that exceeds the trust provider fee amount and storing the bulk amount in association with the customer for subsequent deduction of trust provider fees from the bulk amount by the smart contract.

8. The method as recited in claim 1, wherein obtaining the funds from the decentralized data confidence fabric bank is performed on a per-annotation basis by the smart contract, after the smart contract has determined that the credit limit of the customer has not been exceeded wherein for each annotation the smart contract checks the credit limit of the customer and transfers the trust provider fee only when the credit limit has not been exceeded.

9. A non-transitory storage medium having stored therein instructions that are executable by one or more hardware processors to perform operations comprising:

connecting a digital wallet of a customer to an agent of a data confidence fabric, where the data confidence fabric is an operating environment in which one or more physical computing devices, including an edge device, operate as respective nodes of the data confidence fabric, wherein the data confidence fabric is associated with a decentralized data confidence fabric bank;

registering a smart contract between the client and the decentralized data confidence fabric bank, within which the decentralized data confidence fabric bank calculates, using an oracle, a credit limit of the customer upon reception of a query by querying data confidence fabric and billing ledgers to obtain past transactions and payment history of the customer and determining a maximum loan amount based on the queried information;

receiving, from a customer application running on the edge device, a request for performance of trust services that comprise a trust function, by one or more computing devices implementing the data confidence fabric, with respect to customer data;

processing, by a trust provider that communicates with the edge device, the customer data by applying the trust function to the customer data, and applying the trust function comprises generating trust metadata concerning the customer data that is accumulated across multiple nodes including a gateway, edge server, and cloud ecosystem and associated with the customer data via respective application programming interfaces (APIs) as the customer data flows through the nodes, and by the one or more computing devices implementing the data confidence fabric and the trust provider;

by the edge device, returning the customer data and the trust metadata to the agent under control of the one or more computing devices implementing the data confidence fabric;

creating, by the trust provider, annotations for the customer data, where the annotations are created based on the trust metadata and wherein the trust metadata comprises confidence scores associated with trust insertion processes performed by the nodes;

transmitting, by the trust provider, the annotations, and a corresponding trust provider fee amount, to a smart contract that enforces payment terms by automatically executing transactions based on conditions of the smart contract; and when the digital wallet of the customer does not have adequate funds to cover the trust provider fee amount, obtaining funds from a digital wallet of the decentralized data confidence fabric bank of funding associated with the data confidence fabric based on the smart contract including automatically deducting the trust provider fee amount from a bank wallet or transferring a bulk loan amount to the smart contract and transferring fees per annotation based on a credit limit determination.

10. The non-transitory storage medium as recited in claim 9, wherein after funds are obtained to cover the fee, the customer data and annotations are transmitted to the customer.

11. The non-transitory storage medium as recited in claim 9, wherein the smart contract enables communication of funding between the customer and the decentralized data confidence fabric bank.

12. The non-transitory storage medium as recited in claim 9, wherein the obtaining of the funds from the decentralized data confidence fabric bank associated with the data confidence fabric enables the customer to continue to receive trust services from the data confidence fabric without interruption that would otherwise result from lack of payment, by the customer, of the trust provider fee amount.

13. The non-transitory storage medium as recited in claim 9, wherein obtaining the funds from the decentralized data confidence fabric bank comprises deduction, by a smart contract, of the trust provider fee amount from the decentralized data confidence fabric bank in response to determining that the digital wallet of the customer has insufficient funds to cover the trust provider fee amount.

14. The non-transitory storage medium as recited in claim 9, wherein after the smart contract obtains the funds from the decentralized data confidence fabric bank, the smart contract transmits the funds to a digital wallet of the trust provider.

15. The non-transitory storage medium as recited in claim 9, wherein obtaining the funds from the decentralized data confidence fabric bank comprises transferring, from the decentralized data confidence fabric bank to a smart contract, a bulk amount of funds that exceeds the trust provider fee amount and storing the bulk amount in association with the customer for subsequent deduction of trust provider fees from the bulk amount by the smart contract.

16. The non-transitory storage medium as recited in claim 9, wherein obtaining the funds from the decentralized data confidence fabric bank is performed on a per-annotation basis by the smart contract, after the smart contract has determined that the credit limit of the customer has not been exceeded wherein for each annotation the smart contract checks the credit limit of the customer and transfers the trust provider fee only when the credit limit has not been exceeded.

* * * * *